April 26, 1949.     C. A. SCHRINER     2,468,689
PINFEATHER REMOVER
Filed Sept. 19, 1946
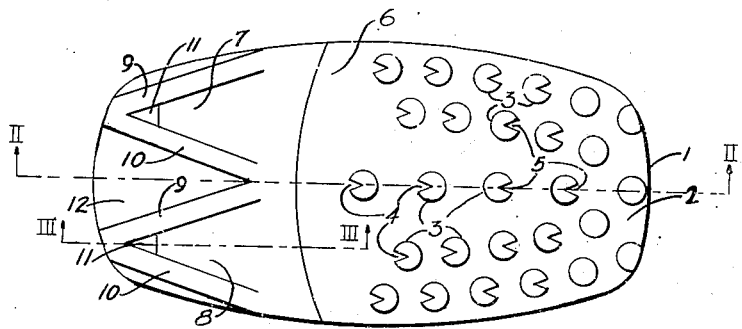
Fig. I
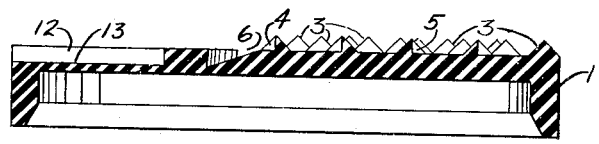
Fig. II
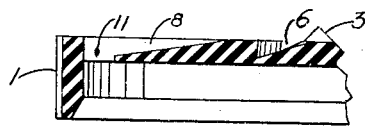
Fig. III
Carl A. Schriner
INVENTOR.
BY
Marshall and Marshall
ATTORNEYS Patented Apr. 26, 1949

2,468,689

UNITED STATES PATENT OFFICE 2,468,689

PINFEATHER REMOVER

Carl A. Schriner, Defiance, Ohio

Application September 19, 1946, Serial No. 697,855

2 Claims. (Cl. 17—11.1)

This invention relates to the removing of feathers and hairs from the skin of a fowl and more particular to a hand held device for removing pinfeathers and fine hairs which may remain on the skin after the large feathers have been plucked.

The principal object of this invention is to provide a small manually held device which can be rubbed over the skin of a fowl in order to remove small feathers and hairs which are not easily grasped in the fingers.

The device consists of a molded rubber body provided with protuberances and slots which catch and remove the feathers from the skin of the fowl.

In the drawings:

Figure I is a plan view of a device embodying the invention.

Figure II is a vertical sectional view taken substantially on the line II—II of Figure I.

Figure III is a fragmentary vertical sectional view taken substantially on the line III—III of Figure I.

The device has a hollow body 1 which is formed of a resilient material, for example, molded rubber. The body 1 has a substantially flat upper surface 2 on which are formed a plurality of cone-shaped protuberances 3 which are arranged over the surface 2 on the rear half of the body 1. Certain of the protuberances 3 have forwardly directed notches 4 and certain other of the protuberances have rearwardly directed notches 5. Still others of the protuberances 3 have no notches at all, and are located at the rearmost portion of the body 1.

A curved groove 6 is cut across the top surface 2 of the body 1 being slightly under cut at its forward edge and slanting upwardly and backwardly to the substantially flat surface 2.

At the forward end of the body 1 there are formed two V-grooves 7 and 8 each having raised side walls 9 and 10. The bottom surface of each of the grooves 7 and 8 slants downwardly (see Figure III) and culminates in an aperture 11 located at the apex of the groove. The aperture 11 leads through the upper wall of the body 1 into its hollow interior. A third groove 12 is formed between the wall 10 of the groove 7 and the wall 9 of the groove 8, the groove 12 having a flat bottom 13 which is not in communication with the interior of the body 1.

In using the device it is grasped in the fingers of the hand and turned with the protuberances 3 and grooves 6, 7, 8 and 12 downwardly. It is then rubbed over the skin of the fowl. The notches 4 and 5 in certain of the protuberances 3 catch some of the small pinfeathers and hairs and pull them out of the skin. Similarly the apexes of the grooves 7, 8 and 12 catch some of the pinfeathers and hairs and pull them out of the skin. The device is preferably made from a resilient material so that it can be squeezed in the hand to flex its upper surface slightly permitting its use on concave and convex surfaces of the fowl. The end of the device on which the protuberances 3 are raised can be used most effectively for removing pinfeathers and hairs from wings and other small parts of the fowl that do not have extensive flat surfaces.

The groove 6 serves to pucker and gather the skin of the fowl, thus causing the pinfeathers and hairs to be erected above the skin so that friction between the edge of the groove 6 and the pinfeathers or hairs will start their removal.

By actual operation of this device it has been found that the scrubbing motion with which it is most effectively used results in an easy and complete removal of the small pinfeathers and hairs which remain in the skin of the fowl after the large hairs have been plucked. It also serves to clean the skin of the fowl removing dirt and other foreign matter which may have been deposited thereon during the life of the fowl. The device is much simpler to operate, much less expensive to manufacture and less likely to cause damage to the skin than other more cumbersome mechanical pinfeather removing devices.

The embodiment of the invention which has been described may be modified to meet various requirements.

Having described the invention, I claim:

1. A manually held pinfeather remover having a resilient body with a fowl contacting surface and a plurality of protuberances raised on said surface, some of said protuberances having notches formed in their surfaces all of the notches being cut with their apexes directed longitudinally of said body, parallel to the direction of motion thereof when in use and extending vertically in said protuberances, the walls of the notches lying in vertical planes meeting at acute angles, some of the notches having their apexes directed oppositely to others, whereby said walls of the notches grasp pinfeathers by wedging action when said remover is rubbed over the skin of a fowl.

2. A manually held pinfeather removing device for movement in a substantially straight line over the surface of a fowl that is characterized by having a resilient fowl contacting surface, that has a plurality of raised resilient, integral protuberances thereon, said protuberances having notches cut in their sides, the walls of the notches extending vertically and meeting at acute angles with the apexes thereof lying on vertical lines and being directed substantially parallel to the line of movement of the device, the apexes of some of the notches being directed one way and the apexes of others being directed oppositely, and that has at least one V-shaped depression therein delineated by integral raised substantially straight walls meeting at an acute angle and forming an angle lying in a horizontal plane and substantially bisected by a line parallel to the direction of movement of said device.

CARL A. SCHRINER.

REFERENCES CITED

The following references are of record in the file of this patent:

UNITED STATES PATENTS

| Number | Name | Date |
|---|---|---|
| 66,856 | Lane | July 16, 1867 |
| 154,154 | Sawyer | Aug. 18, 1874 |
| 600,194 | Doughty | Mar. 8, 1898 |
| 904,800 | Nelson | Nov. 24, 1908 |
| 1,006,630 | Clarke | Oct. 24, 1911 |
| 1,885,572 | Wood | Nov. 1, 1932 |
| 1,935,099 | O'Donnell | Nov. 14, 1933 |
| 1,987,390 | Davis | Jan. 8, 1935 |
| 2,294,900 | Fuller | Sept. 8, 1942 |

FOREIGN PATENTS

| Number | Country | Date |
|---|---|---|
| 492,752 | Germany | Mar. 1, 1930 |